Aug. 9, 1932. G. K. McNEILL 1,871,334
CUTTING MACHINE
Filed Sept. 17, 1929 2 Sheets-Sheet 1
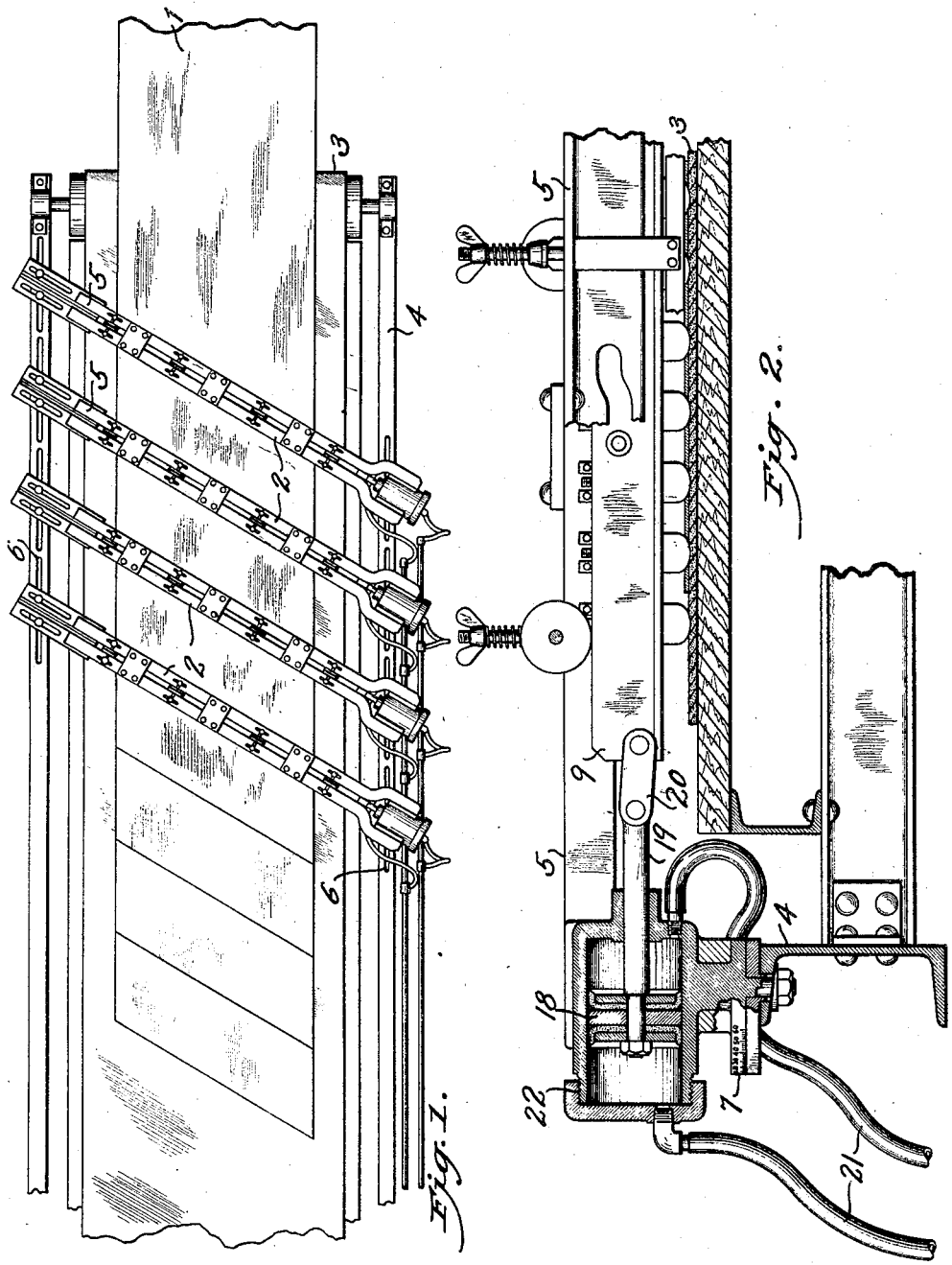
INVENTOR
George K. McNeill
BY
ATTORNEY

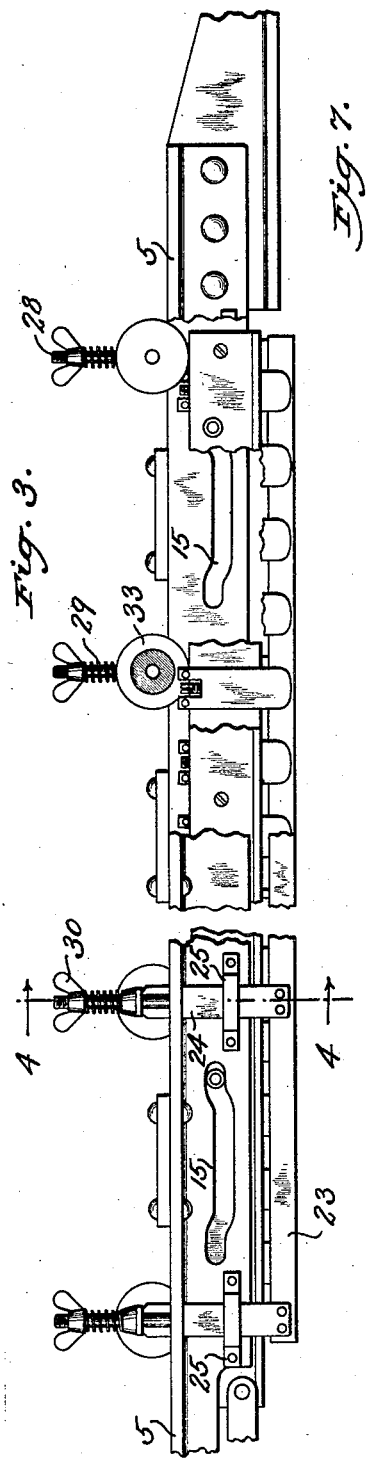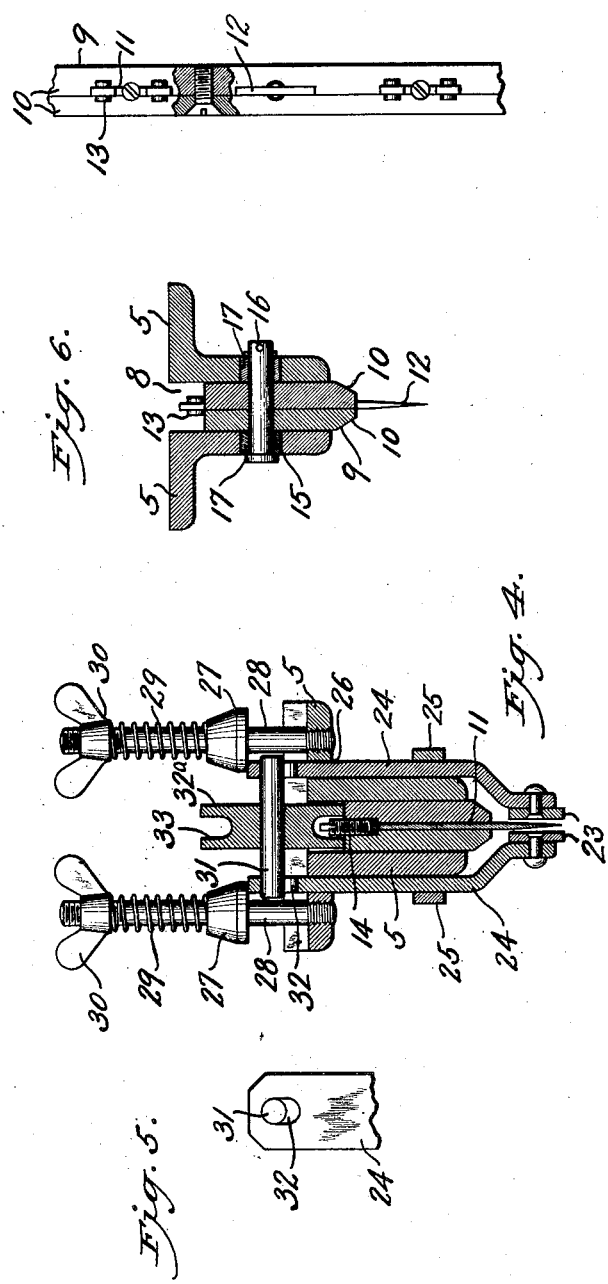

Patented Aug. 9, 1932

1,871,334

UNITED STATES PATENT OFFICE

GEORGE K. McNEILL, OF DETROIT, MICHIGAN, ASSIGNOR TO MORGAN & WRIGHT, OF DETROIT, MICHIGAN, A CORPORATION OF MICHIGAN

CUTTING MACHINE

Application filed September 17, 1929. Serial No. 393,161.

This invention relates to a machine for severing fabric.

Heretofore fabric cutting machines in which a single cutting element arranged to traverse the whole width of the fabric to be cut have been devised. In such fabric cutting machines the length of stroke of the cutting member is such as to make the construction unwieldy and of a nature liable to get out of order.

It is the object of this invention to provide a cutting machine in which the cutting member shall have a short stroke less than the total line of cut. It is also the object of this invention to provide a clamping means for holding down the fabric adjacent the cut which is automatically operated by the cutting means. Another object of this invention is to provide a cutting machine adapted to make a plurality of cuts at once to form strips of the same or various widths.

Other objects and advantages of the present invention will appear in the following detailed description taken in connection with the accompanying drawings, in which:

Fig. 1 is a plan view of the machine of this invention;

Fig. 2 is a section partly in elevation of one of the cutting devices of this invention;

Fig. 3 is a broken away side elevation of the cutting device;

Fig. 4 is a sectional view taken on line 4—4 of Fig. 3;

Fig. 5 is a detail of the parts shown in Fig. 4;

Fig. 6 is a cross sectional detail of the cutting member;

Fig. 7 is a detail plan view partly in section of the cutting member.

The fabric 1 to be cut, which usually is in the form of a long sheet or strip, is advanced to the cutting devices 2 in any suitable way, and preferably by a conveyor 3. The conveyor 3 is provided with an intermittent drive so that the fabric 1 will be moved forward a distance sufficient to bring an uncut portion of fabric beneath all of the cutting devices 2 at once. The cutting devices 2 may be spaced at equal distances so that strips will be cut from the fabric of equal width or if desired the cutting devices 2 may be spaced unequally so that a plurality of strips of various widths, such as might be employed in the building of a tire carcass, may be simultaneously cut from the fabric.

The cutting devices 2 are conveniently mounted upon the frame 4 of the conveyor. The cutting devices 2 are provided with the members 5 suitably secured together to form a rigid frame extending across the fabric. The frame composed of members 5 is adjustably mounted at its ends on the frame 4 of the conveyor by bolts or other suitable fastening devices passing through the slots 6 in the frame of the conveyor. For convenience the graduated sector 7 may be provided for determining the angular position of the frame with respect to the direction of travel of the fabric on the conveyor.

The frame members 5 are so disposed as to provide a slot 8 therebetween in which the cutting member 9 is mounted for sliding movement. The cutting member 9 is preferably composed of two bars 10 fastened together in any suitable manner as by screws. In either or both of the bars 10 at regularly spaced intervals along the length thereof are provided a plurality of slots 11 adapted to accommodate knives or other cutting members 12. The knives 12 are provided with lugs 13 projecting laterally from the top thereof which limit the downward adjustment of the knives in the slots 11. Screws or other suitable adjusting means 14 may be provided in the bars 10 for forcing and clamping the knives 12 in position.

In order that the knives may be moved into cutting engagement with the fabric, withdrawn therefrom and maintained in cutting engagement with the fabric for a suitable length of stroke, cam means cooperating between the frame members 5 and the cutting member 9 are provided. The cam means may take any suitable form, but preferably consist of slots 15 formed in the depending portions of frame members 5 in which slots the pin 16 and cam followers 17 ride, the pin 16 being fixed in the cutting member 9 and the cam followers 17 being rotatably mounted on pin 16. The cam slot 15 is of shape such that, as shown in Fig. 3, when the pin 16 occupies a position at either end of the slot 15 the cutting member 9 and knives 12 are out of cutting engagement with the fabric. At positions intermediate of the ends of the slot 15 the knives 12 are held in cutting engagement with the fabric. Due to the shape of the cam slots 15 it is seen that with each stroke of the cutting member in either direction the knives are moved into cutting engagement with the fabric, maintained in such cutting engagement for a sufficient length of stroke and finally withdrawn from cutting engagement with the fabric.

The cutting member 9 is actuated by any suitable means and preferably by the pneumatic piston 18 connected to the cutting member 9 through piston rod 19 and link 20. The piston 18 is of the double actuated type and connections 21 are provided for supplying fluid under pressure to both ends of the cylinder 22. Due to the large number of knives and the regular spacing along the cutting member 9 with their edges in the plane of movement of the cutting member, the length of stroke necessary is only such as will carry one knife into the cut of the next adjacent knife. Due to the provision of the cam slot 15 for moving the knives into and out of engagement with the fabric, by virtue of the movement of the cutting member 9, it is necessary that the stroke be slightly longer than the distance between adjacent knives in order that the end portions of the cam slot 15 be effective.

It is necessary in cutting the fabric to provide some means for holding the fabric adjacent the cut. For this purpose bars 23 are disposed on both sides of the knives 12 and adjacent thereto. The bars 23 are supported by arms 24 slidable through clips 25 fixed to the frame members 5. The upper ends of the arms 24 move through slots 26 in the frame members 5. The clamping bars 23 may by virtue of their own weight supply sufficient clamping action on the fabric or a positive clamping means may be provided, or preferably as shown herein a suitable resilient means is provided for forcing the bars 23 into engagement with the fabric. As shown in Fig. 4 a resilient force applied to the bars may be transmitted to the arms 24 by collars 27 which engage the upper extremities of the arms 24 and are slidable upon the shafts 28 fixed in the frame members 5. Springs 29 rest at one end upon the collars 27 and at their other ends upon suitable members adjustable upon the shafts 28 such as wing nuts 30.

In order to render the operation of the cutting machine as nearly automatic as possible, it is preferable to actuate the clamping bars by the movement of the cutting member 9. In order to effect this action, a lost motion connection is provided between the arms 24 and the cutting member 9 which takes the form of pin 31 which extends at its ends through slots 32 in the arms 24. Pin 31 carries the disk 32a provided with a circumferentially extending recess 33. The disk 32a rides upon the top face of the bars 10, the recess 33 being provided to accommodate the screw 14 as shown in Fig. 4. As will be seen in Fig. 4, when the cutting member 9 is in raised position the pin 31 is in engagement with the arms 24 and maintains the arms 24 and clamping bars 23 out of engagement with the fabric. When the cutting member 9 is actuated the cam slot 15 moves it downwardly so as to bring the knives into engagement with the fabric and the downward movement of the cutting member 9 permits the arms 24 and clamping bars 23 to lower under the action of springs 29. As will be seen in Fig. 4 when the cutting member and clamping bars are in elevated position the knives are drawn into a space between the clamping bars 23. As the cutting member 9 and clamping bars 23 are lowered the clamping bars 23 engage the fabric first. The downward movement of the clamping bars 23 is limited by the fabric, and the springs 29 serve to press the clamping bars 23 against the fabric so as to clamp it securely between the clamping bars 23 and the conveyor. After the clamping bars 23 have come into engagement with the fabric, the cutting member 9 and plates 12 continue downwardly under the action of cam slot 15 and move into cutting engagement with the fabric. Such relative motion of the clamping bars 23 and the knives 12 is permitted by the lost motion connection between the pin 31 and slot 32.

In the operation of the device, the fabric 1 is brought beneath the cutting devices 2. Air under pressure is introduced into the cylinders 22 so as to move the cutting members 9 in either direction. As the cutting members 9 move in either direction, the cam slots 15 cause the cutting members 9 to move downwardly so as to bring the clamping bars 23 into engagement with the fabric, and subsequently the knives 12 into cutting engagement with the fabric. Further motion of the cutting member 9 causes the fabric to be severed by the knives, the length of stroke being such as to make continuous the individual slits formed by the knives. Further motion of the cutting member 9 causes, by the action of cam slot 15, the knives 12 and clamping bars 23 to be raised from the fabric, thus completing a cycle of operations. The fabric 1 may be then moved forward by the conveyor and the cycle of operations repeated. It is to be noted that a complete cycle of operations is effected with a movement of the piston 18 in either direction.

While one embodiment of the invention has been described in detail by way of illustration, it is not intended so to limit the invention inasmuch as many modifications in the parts and arrangements thereof may be made as will be apparent to one skilled in the art without departing from the scope of the invention, which is indicated in the following claims.

Having thus described my invention, what I claim and desire to protect by Letters Patent is:

1. A fabric cutting machine having in combination a frame disposed across the fabric, a bar mounted for movement within the frame, a series of knives regularly spaced along the bar and mounted with their cutting edges in the plane of movement, a clamping means arranged to clamp the fabric adjacent the cut, and a single cylinder means for moving the clamping means transversely and the bar lengthwise.

2. A fabric cutting machine having in combination a frame disposed across the fabric, a rigid member mounted for movement in the frame, a series of regularly spaced cutting members mounted on the rigid member with their edges in the plane of movement of the rigid member, means for moving the rigid member a distance slightly greater than the spacing between the cutting members, said frame and rigid member having cooperating cam means which, during and by reason of the movement of the rigid means, moves the cutting members into cutting relation with the fabric, maintains the cutting members in cutting relation with the fabric through a distance of movement approximately equal to the spacing between the cutting members and withdraws the cutting members from the fabric.

3. A fabric cutting machine having in combination a frame disposed across the fabric, cutting means mounted for movement in the frame, said frame and cutting means carrying operating cam means for moving the cutting member into and out of cutting relation with the fabric upon endwise movement of the cutting member, a clamping means for clamping the fabric adjacent the cut, connections between the cutting means and the clamping means whereby the clamping means is moved into and out of engagement with the fabric upon movement of cutting means, and means for operating the cutting means.

4. A fabric cutting machine having in combination a frame disposed across the fabric, cutting means mounted for movement on the frame, said frame and cutting means being provided with cam means for moving the cutting means into and out of cutting relation with the fabric, clamping means adapted to engage the fabric adjacent the cut, resilient means arranged to urge the clamping means into engagement with the fabric, a lost motion connection between the cutting means and the clamping means for moving the clamping means from the fabric when the cutting means is withdrawn, and for permitting the clamping means to engage the fabric when the cutting means is in cutting engagement with the fabric, and means for operating the cutting means.

5. A fabric cutting machine having in combination, a frame disposed across the fabric, a rigid member movably mounted in the frame, knives mounted in regularly spaced relation on the rigid member with their edges in the plane of movement of the rigid member, means for moving the rigid member a distance slightly greater than the spacing between adjacent knives, said frame and rigid member being provided with cam means whereby the knives are moved into cutting engagement with the fabric, maintained in cutting engagement with the fabric through a stroke approximately equal to the spacing between adjacent knives and withdrawn from cutting engagement with the fabric upon movement of the rigid member, clamping means mounted on the frame for engaging the fabric adjacent the cut, a lost motion connection between the rigid member and the clamping means whereby the clamping means is withheld from engagement with the fabric when the knives are withdrawn from the fabric and the clamping means is permitted to engage the fabric when the knives are in cutting engagement with the fabric.

6. A fabric cutting machine having in combination, a frame disposed across the fabric, a rigid member movably mounted in the frame, knives mounted in regularly spaced relation on the rigid member with their edges in the plane of movement of the rigid member, means for moving the rigid member a distance slightly greater than the spacing between adjacent knives, said frame and rigid member being provided with cam means whereby the knives are moved into cutting engagement with the fabric, maintained in cutting engagement with the fabric through a stroke approximately equal to the spacing between adjacent knives, and withdrawn from cutting engagement with the fabric upon movement of the rigid member, clamping means mounted on the frame for engaging the fabric adjacent the cut, a lost motion connection between the rigid member and the clamping means whereby the clamping means is withheld from engagement with the fabric when the knives are withdrawn from the fabric and the clamping means is permitted to engage the fabric when the knives are in cutting engagement with the fabric, and means for adjusting the angular position of the frame with respect to the fabric.

7. A fabric cutting machine having in combination a frame disposed across the fabric, a rigid member mounted for movement in the frame, a series of regularly spaced cutting members mounted on the rigid member with their edges in the plane of movement of the rigid member, means for moving the rigid member a distance slightly greater than the spacing between the cutting members, said frame and rigid member having cooperating pin and slot means which during and by reason of the movement of the rigid means moves the cutting members into cutting relation with the fabric, maintains the cutting members in cutting relation with the fabric through a distance of movement approximately equal to the spacing between the cutting members and withdraws the cutting members from the fabric.

8. A cutting device comprising an elongated frame, cutting means mounted on and movable lengthwise of the frame, clamping means carried by said frame and movable transversely thereof, connecting means between said cutting and clamping means for moving the latter transversely in accordance with lengthwise movement of the cutting means, and means for actuating the cutting means.

9. A cutting device comprising a frame, cutting means comprising a bar mounted on and movable longitudinally of the frame, clamping means carried by said frame and movable transversely thereof, connecting means between said bar and clamping means for moving the latter transversely in accordance with longitudinal movement of the bar, and means for actuating the bar.

10. A fabric cutting machine having in combination a frame disposed across the fabric, cutting means mounted for movement in the frame, said frame and cutting means being provided with cam means for moving the cutting member into and out of cutting relation with the fabric upon endwise movement of the cutting member, a clamping means for clamping the fabric adjacent the cut, connections between the cutting means and the clamping means whereby the clamping means is moved into and out of engagement with the fabric upon movement of cutting means, and means for operating the cutting means.

11. A fabric cutting machine comprising a pair of spaced bars carrying oppositely projecting portions disposed across the fabric in fixed position for forming a frame, guiding openings formed in said projecting portions, cutting means arranged between and carried by said bars, fabric clamping means comprising clamping members arranged beneath said bars and on opposite sides of said cutting means, said cutting means and clamping members being movable into and out of engagement with the fabric to be cut, supporting arms for said clamping members extending through said guiding openings, a supporting member for said supporting arms, mounted in said arms for continuously engaging the back of said cutting means, and resilient means carried by said bars and engaging said supporting arms for continuously urging said clamping members toward the said fabric and for urging said supporting member against the back of said cutting means when said cutting means moves out of engagement with said fabric.

Signed at Detroit, county of Wayne, State of Michigan, this 5th day of September, 1929.

GEORGE K. McNEILL.